US009555967B2

(12) United States Patent
Stevens

(10) Patent No.: US 9,555,967 B2
(45) Date of Patent: Jan. 31, 2017

(54) LIFT CONFIGURATION FOR CARRIAGE-BASED WAREHOUSE

(71) Applicant: Dematic Corp., Grand Rapids, MI (US)

(72) Inventor: Criston S. Stevens, Layton, UT (US)

(73) Assignee: DEMATIC CORP., Grand Rapids, MI (US)

( * ) Notice: Subject to any disclaimer, the term of this patent is extended or adjusted under 35 U.S.C. 154(b) by 0 days.

(21) Appl. No.: 14/755,580

(22) Filed: Jun. 30, 2015

(65) Prior Publication Data
US 2016/0009492 A1    Jan. 14, 2016

Related U.S. Application Data

(60) Provisional application No. 62/021,901, filed on Jul. 8, 2014.

(51) Int. Cl.
*B65G 1/04* (2006.01)
*B65G 1/137* (2006.01)
*B65G 1/06* (2006.01)

(52) U.S. Cl.
CPC ............ *B65G 1/137* (2013.01); *B65G 1/04* (2013.01); *B65G 1/065* (2013.01)

(58) Field of Classification Search
CPC ... B65G 1/0492; B65G 1/0485; B65G 1/0414; B65G 1/065
See application file for complete search history.

(56) References Cited

U.S. PATENT DOCUMENTS

| 3,924,300 A * | 12/1975 | Hilger ............... B65G 1/0485 414/279 |
| 4,773,807 A | 9/1988 | Kroll et al. |
| 6,061,607 A | 5/2000 | Bradley et al. |
| 8,731,740 B2 * | 5/2014 | Ogawa .................. B65G 1/06 701/1 |

(Continued)

FOREIGN PATENT DOCUMENTS

| AT | EP 2119643 A1 * | 11/2009 | ........... B65G 1/0485 |
| AT | WO 2012106744 A1 * | 8/2012 | ........... B65G 1/0492 |

(Continued)

OTHER PUBLICATIONS

International Search Report (Form PCT/ISA/210) and Written Opinion of the International Searching Authority (Form PCT/ISA/237) from corresponding Patent Cooperation Treaty Application No. PCT/US2015/038579, mailed Oct. 1, 2015.

(Continued)

*Primary Examiner* — Kaitlin Joerger
(74) *Attorney, Agent, or Firm* — Gardner, Linn, Burkhart & Flory, LLP

(57) ABSTRACT

An automated warehouse system and method of storing articles to and retrieving articles from an automated warehouse system includes at least two stacked longitudinally extending racks that are laterally separated by an aisle, each of said racks having a plurality of levels, with storage locations on each of the levels. An automated carriage at each of said levels travels longitudinally along the associated aisle and is adapted to store articles to and retrieve articles from each of the racks at that level. A lift arrangement for delivering articles to and retrieving articles from the levels of the stacked racks includes more than one lift assembly for at least one of the racks.

22 Claims, 5 Drawing Sheets

(56) References Cited

U.S. PATENT DOCUMENTS

| | | | | |
|---|---|---|---|---|
| 8,876,454 | B2* | 11/2014 | Koholka | B65G 1/1378 414/277 |
| 8,948,909 | B2* | 2/2015 | Ogawa | B65G 1/0492 700/213 |
| 8,954,188 | B2* | 2/2015 | Sullivan | G06Q 10/08 414/273 |
| 8,974,168 | B2* | 3/2015 | Yamashita | B65G 1/065 414/277 |
| 9,266,675 | B2* | 2/2016 | Yamashita | B65G 1/0492 |
| 2005/0008463 | A1 | 1/2005 | Stehr et al. | |
| 2011/0008137 | A1 | 1/2011 | Yamashita | |
| 2012/0009047 | A1 | 1/2012 | Ogawa | |
| 2012/0177465 | A1* | 7/2012 | Koholka | B65G 1/0492 414/279 |
| 2012/0328397 | A1 | 12/2012 | Yamashita | |
| 2013/0094927 | A1* | 4/2013 | Ogawa | B65G 1/065 414/281 |
| 2013/0129469 | A1 | 5/2013 | Salichs et al. | |
| 2014/0124462 | A1* | 5/2014 | Yamashita | B65G 1/0414 211/1.57 |
| 2014/0212257 | A1 | 7/2014 | Yamashita | |
| 2015/0336741 | A1* | 11/2015 | Ahammer | B65G 1/0485 414/281 |

FOREIGN PATENT DOCUMENTS

| | | | | |
|---|---|---|---|---|
| AT | WO 2012123335 A1 * | 9/2012 | | B65G 1/0485 |
| NL | EP 2923971 A1 * | 9/2015 | | B65G 1/0492 |

OTHER PUBLICATIONS

Commonly assigned co-pending U.S. Appl. No. 14/797,222, filed Jul. 13, 2015, entitled Picking Station With Automated Warehouse.
Commonly assigned co-pending U.S. Appl. No. 14/817,580, filed Aug. 4, 2015, entitled Order Fulfillment Technique.

* cited by examiner

LIFT CONFIGURATION FOR CARRIAGE-BASED WAREHOUSE

CROSS REFERENCE TO RELATED APPLICATION

This application claims priority from U.S. patent application Ser. No. 62/021,901, filed on Jul. 8, 2014, the disclosure of which is hereby incorporated herein by reference.

BACKGROUND OF THE INVENTION

The present invention is directed to an automated warehouse system having at least two stacked longitudinally extending racks that are laterally separated by an aisle and automated carriages at some or all of the levels to store articles to and retrieve articles from each of the racks at that level, and a method of storing articles to and retrieving articles from such automated warehouse system.

In such an automated warehouse system, the articles are supplied to each level of the warehouse system with a lift arrangement. The carriages retrieve articles from storage positions in the racks and dispatch the articles to the lift arrangement or retrieve articles from the lift arrangement and store the articles to a storage position on one of the racks. A computer system coordinates the lift arrangement and the carriages in order to be able to retrieve any articles stored to the automated warehouse system when that article is needed, for example, to fulfil an order in an e-commerce or mail-order system. The article may be a container, such as a tote, that contains a plurality of individual items of the same type, or stock-keeping unit (SKU), or a mixture of different types of items, or SKUs. Alternatively, the article may be a self-contained item that is packed by itself. The number of articles that can be stored to and retrieved from the automated warehouse system in a given period of time is a measure of the efficiency, or through-put, of the system.

SUMMARY OF THE INVENTION

The present invention is directed toward improving the efficiency or through-put of an automated warehouse system. Improvements to the carriage design have increased the efficiency of the carriage so that the carriage is able to store and retrieve articles at a significantly faster rate than the known lift arrangements and are able to deliver articles to the carriage and retrieve articles from the carriage.

An automated warehouse system and method of storing articles to and retrieving articles from an automated warehouse system, according to an aspect of the invention, includes at least two stacked longitudinally extending racks that are laterally separated by an aisle, each of said racks having a plurality of levels, with storage locations on each of the levels. An automated carriage at each of said levels travels longitudinally along the associated aisle and is adapted to store articles to and retrieve articles from each of the racks at that level. A lift arrangement for delivering articles to and retrieving articles from the levels of the stacked racks includes more than one lift assembly for at least one of the racks.

The lift arrangement may include at least two lift assemblies for at least one of the racks. The lift arrangement may include at least two lift assemblies for each of the racks.

The carriage may be capable of storing articles to and retrieving articles from at least two separate rows of articles in at least one of the racks, each of the rows at a different distance from said aisle. At least two lift assemblies are laterally aligned with the at least two rows. A pass-through support may be provided for temporarily supporting articles being dispatched to or retrieved from the laterally spaced lift assembly. The pass-through support is aligned with the one of said rows that is farthest from said aisle.

Access conveyors may be provided that supply articles to or receive articles from each of the lift assemblies. The access conveyors for the lift assemblies may be adapted to be positioned at different elevations. A picking station may be provided at each of the different elevations. The picking stations are connected with the access conveyors for the lift assemblies for the stacked racks. More than one access conveyor may be supplied for at least one of the lift assemblies. An article feeding conveyor may be connected with one of the access conveyors.

The lift assemblies for at least one of the racks may be positioned at different distances from the racks. One of said lift assemblies that is aligned with the row of articles that is farthest from said aisle may be closer to the racks than is the one of the lift assemblies that is aligned with the row of articles that is closest to the aisle.

These and other objects, advantages and features of this invention will become apparent upon review of the following specification in conjunction with the drawings.

DESCRIPTION OF THE PREFERRED EMBODIMENT

Figure 1:
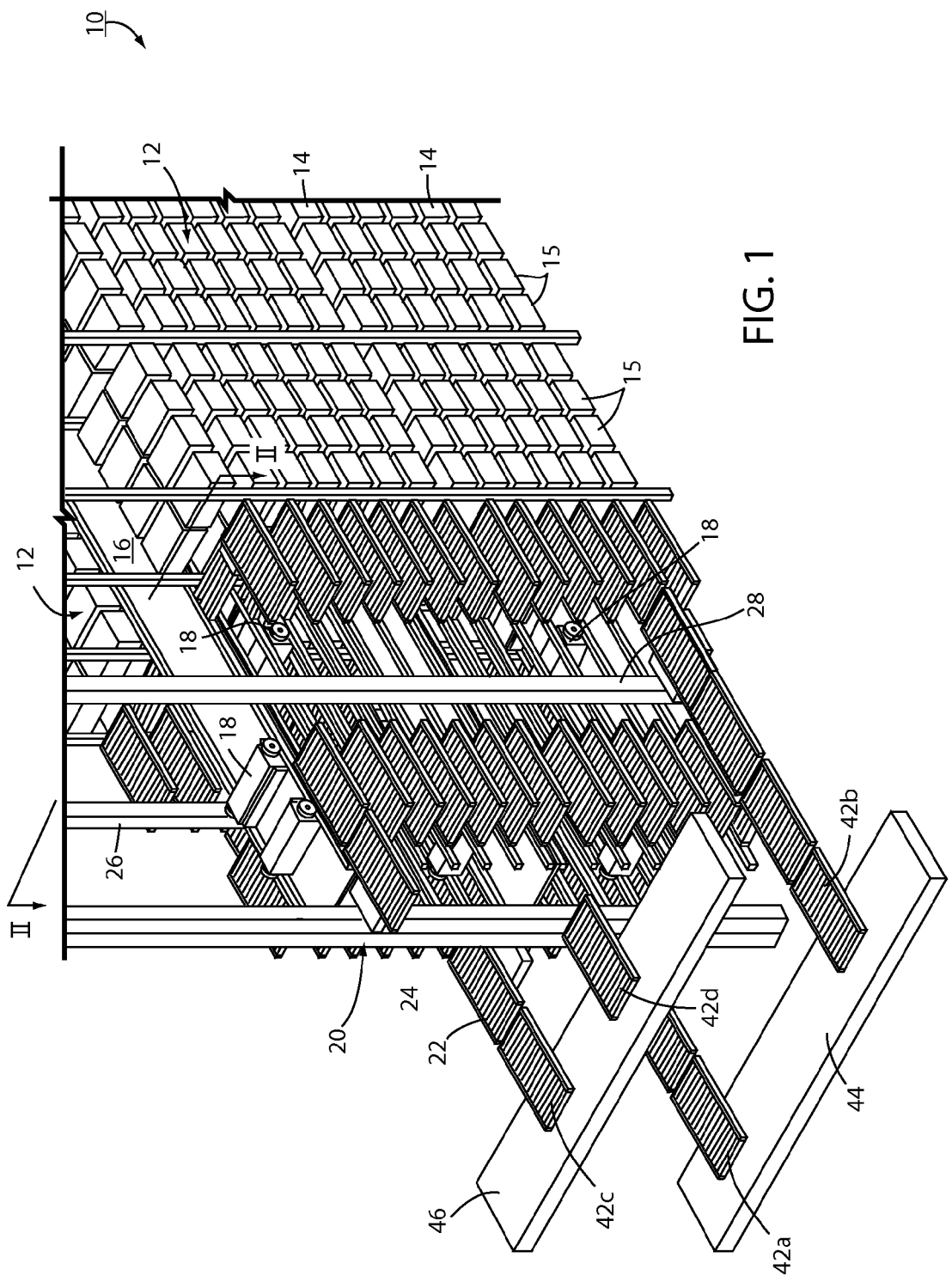
FIG. 1 is a perspective view of an automated warehouse system, according to an embodiment of the invention.

Referring now to the drawings and the illustrative embodiments depicted therein, an automated warehouse system 10 has at least two stacked longitudinally extending racks 12 that are laterally separated by an aisle 16. Each rack 12 has a plurality of levels 14 with storage locations 15 on each of the levels. Such automated warehouse is generally described in U.S. Patent Application Publication No. 2011/0008137 by Shin Yamashita, the disclosure of which is hereby incorporated herein by reference. A plurality of automated carriages 18 are provided, one at each of levels 14. While the invention may also be applied to an automated warehouse in which a carriage is capable of handling more than one level 14 and rides on a lift arrangement between levels, the invention is illustrated for use with the number of carriages equal to at least the number of levels of the warehouse. Any combination of carriages and levels shall hereinafter be referred to as a carriage at each level. Automated carriage 18 travels longitudinally along the associated aisle 16 for the level and stores articles to and retrieves articles from storage locations 15 of each of the racks 12 at that level 14. In the illustrated embodiment, automated carriage 18 is capable of storing articles to and retrieving articles from at least two separate rows 30, 32 of articles in each of racks 12. Each of said rows is at a different distance from aisle 16 with the row closest to aisle 16 designated as 30 and the row farthest from the aisle designated as 32. Such arrangement of articles is known as "double-deep" storage. The details of carriage 18 are disclosed in U.S. Patent Application Publication No. 2011/0008138 by Shin Yamashita, the disclosure of which is hereby incorporated herein by reference. It should be understood that only one cell of an automated warehouse system is shown, while numerous cells are duplicated in an overall warehouse system.

A lift arrangement generally shown at 20 is provided for delivering articles to and retrieving articles from the levels 14 of said stacked racks. As will be described in more detail below, lift arrangement 20 is made up of a first lift assembly 22, a second lift assembly 24, a third lift assembly 26 and a fourth lift assembly 28. Since there are four (4) lift assemblies and two racks 12, it can be seen that lift arrangement 20 has more than one lift assembly (22-28) for each rack 12. Each lift assembly (22-28) has a vertical mast 34 that extends at least the height of each rack 12 and a lift platform 36 that raises and lowers along mast 34 using conventional techniques. Platform 36 is made up of a plurality of driven rollers 37 which are capable of being driven in opposite directions for loading articles to platform 36 and unloading articles from the platform. At each level of racks 12, an aisle conveyor 38 serves as a buffer to hold an article while it is awaiting the lift assembly to pick up that article or after it has been discharged from the lift assembly while the article is awaiting pick-up by carriage 18 to be stored to a storage location 15. In the illustrated embodiment, a pair of access conveyors 42a, 42b are provided at a ground floor level 44 to feed articles to and/or receive articles from lift platform 36 and a pair of access conveyors 42c, 42d are provided at a different floor level, such as a mezzanine level 46 to feed articles to and/or receive articles from lift platform 36. It should be understood that other numbers of access conveyors are possible and do not need to equal to the number of lift assemblies. Also, the access conveyors may be arranged at different levels. For example, it may be possible to have more than four access conveyors for four lift assemblies and they may be placed at more than two levels of the warehouse. Indeed, it is an advantage of the invention that the use of access conveyors is decoupled from the lift assemblies.

Figure 2:
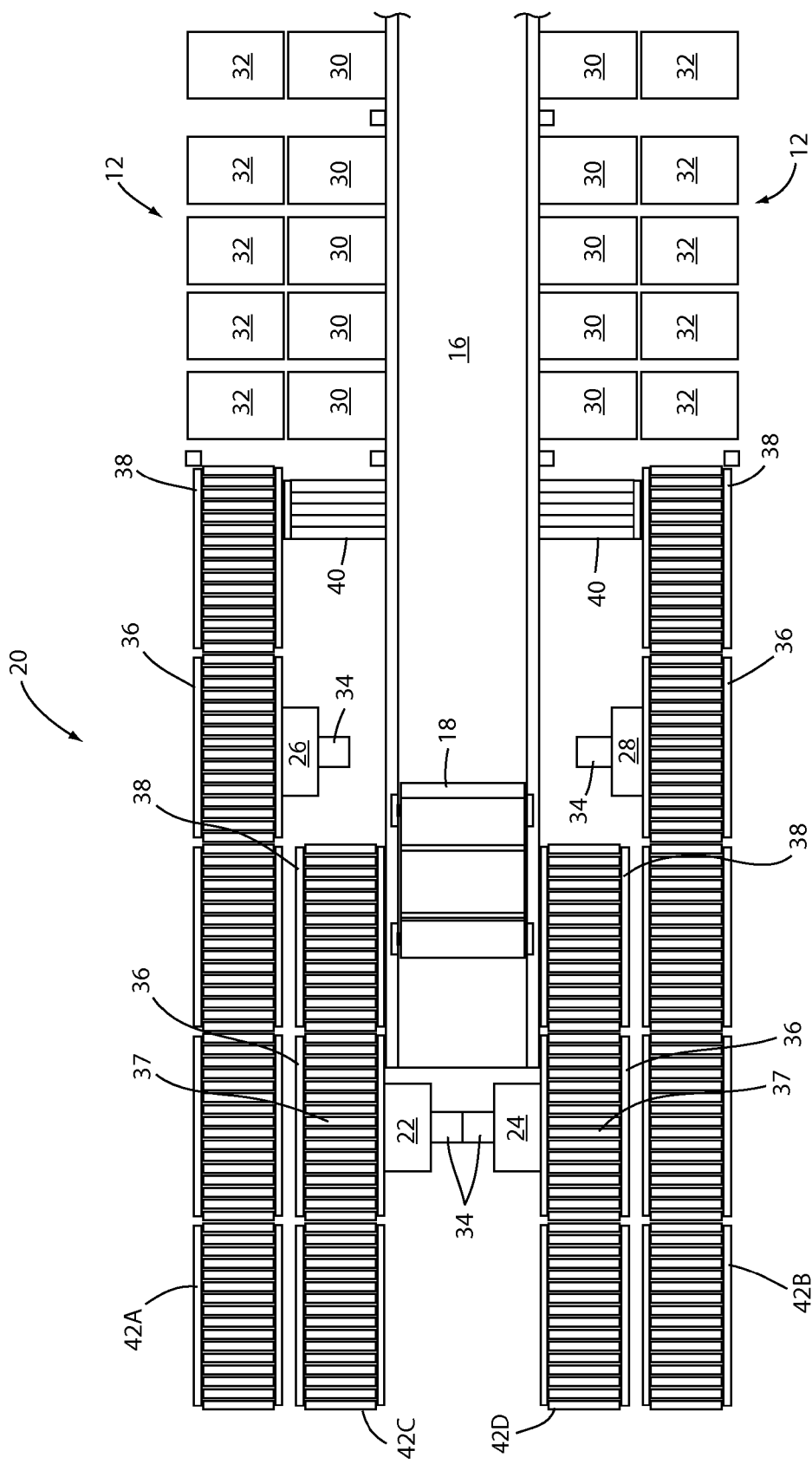
FIG. 2 is a sectional view taken along the lines II-II in FIG. 1.
Figure 3:
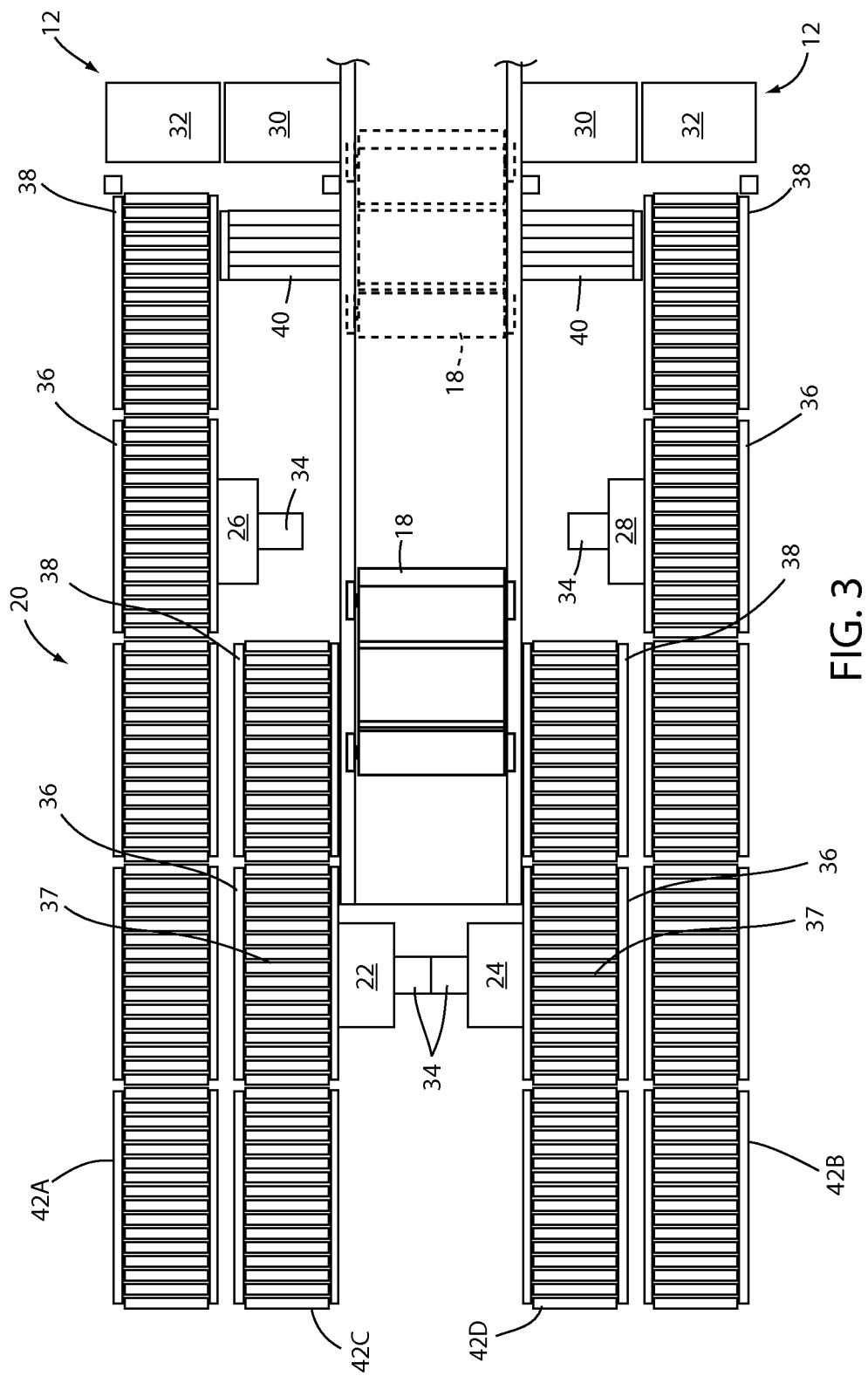
FIG. 3 is an enlarged view of a portion of FIG. 2 illustrating the lift arrangement.

As mentioned above, carriage 18 is capable of storing articles to and retrieving articles from at least two separate rows 30, 32 of articles in each of racks 12, with each of the rows at a different distance from aisle 16. The lift platforms 36 of two lift assemblies 22, 26 are laterally aligned respectively with two rows 30, 32 of one rack 12. The lift platforms 36 of two lift assemblies 24, 28 are laterally aligned respectively with two rows 30, 32 of the other rack 12. Carriage 18 is capable of handling articles to/from conveyors 38 of lift assemblies 22, 24 when in the solid-line position shown in FIGS. 2 and 3 using the same motion as if the articles were being stored to or retrieved from inner rows 30 on the racks. Carriage 18 is also capable of handling articles to/from aisle conveyors 38 of lift assemblies 26 and 28 when in the dashed-line position shown in FIG. 3 using the same motion as if the articles were being stored to or retrieved from outer rows 32 on the racks. A pass-through support 40 is provided between aisle 16 and the aisle conveyor 38 for each lift assembly 26, 28 so that carriage 18 can have a continuous surface to slide articles to and from lift assemblies 26, 28. Also, it can be seen that lift assemblies 26, 28 are longitudinally closer to racks 12 than are lift assemblies 22, 24. This longitudinal spacing allows carriage 18 to access the aisle conveyors 38 of all four lift assemblies in a simple lateral motion. It should be understood that it is possible for carriage 18 to store articles to only one row or more than two rows for each rack, in which case it is referred to triple-deep storage, quadruple-deep storage, or the like. By increasing the number of lift assemblies, such triple-deep and quadruple-deep storage can be optimized, with the lift assemblies arranged using the principle set forth above in a manner that will be apparent to the skilled artisan.

Figure 4:
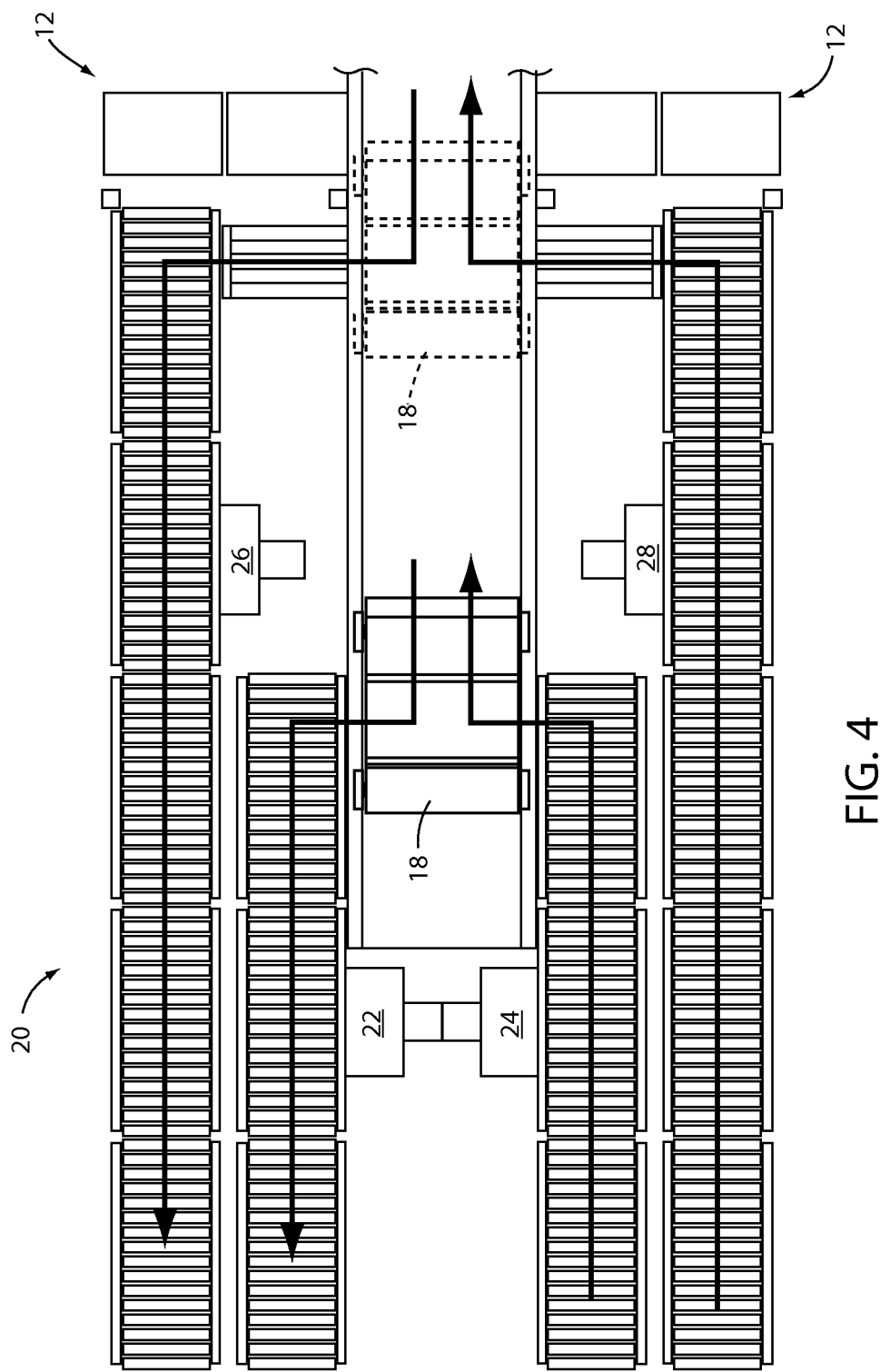
FIG. 4 is the same view as FIG. 3 illustrating an example flow path through the lift arrangement.
Figure 5:
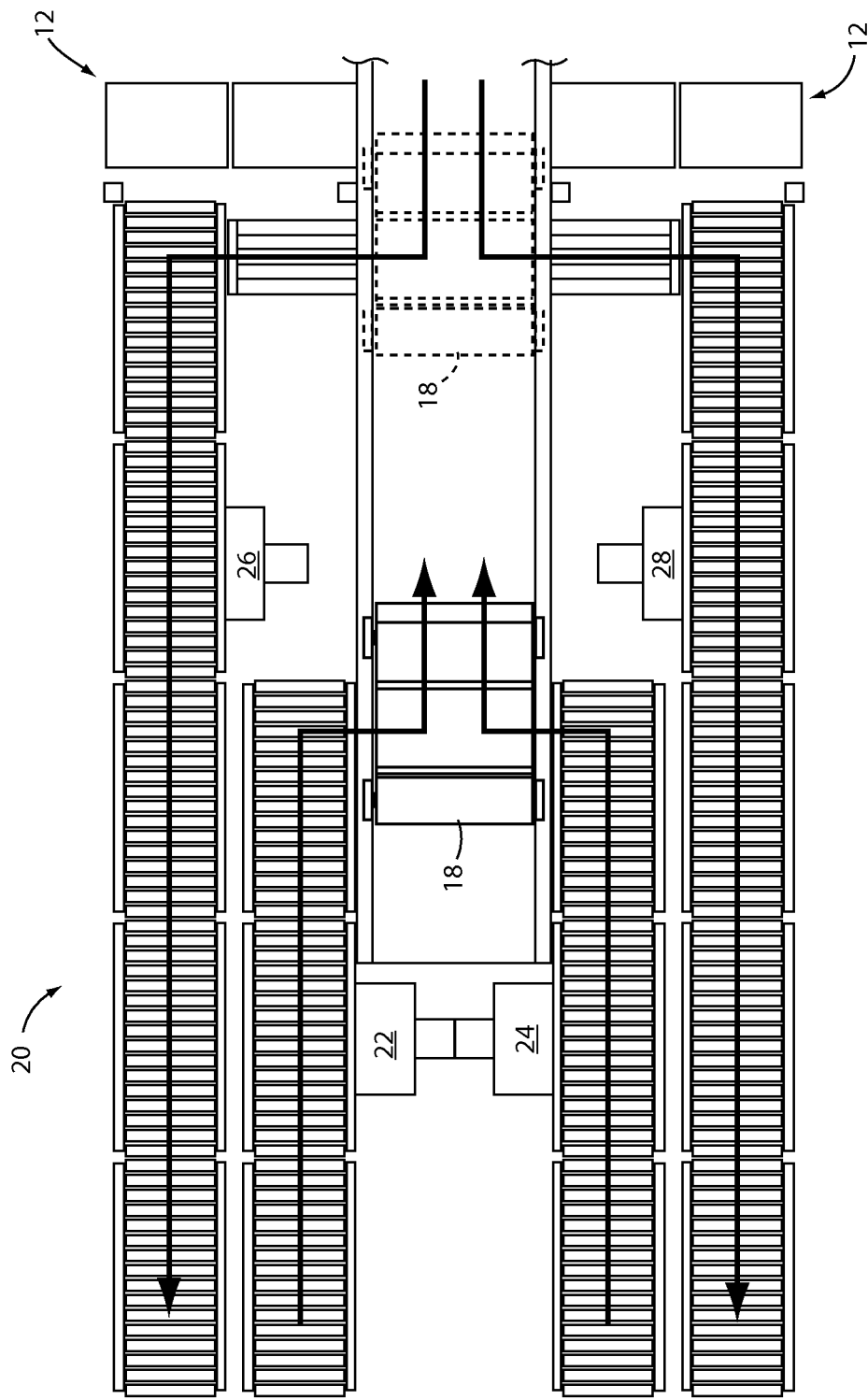
FIG. 5 is the same view as FIG. 3 illustrating another example of a flow path through the lift arrangement.

Flow paths of articles using lift assemblies 22-28 can be configured; however, they are most convenient for the particular installation and can even be changeable depending on the load of the warehouse. For example, as can be seen in FIG. 4, the outer lift assemblies 26, 28 can be used to feed articles to and receive articles from a process, such as a pick station, on one elevation of the facility while the inner lift assemblies 22, 24 service another process on another elevation of the facility. Alternatively, as shown in FIG. 5, the inner lift assemblies 22, 24 can be incoming and the outer lift assemblies 26, 28 can be outgoing. Also, some of the inbound flow paths can be from conveyors feeding articles to be stored to the automated warehouse. Other arrangements are possible and can be changed as needed.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An automated warehouse system, comprising:
   at least two stacked longitudinally extending racks that are laterally separated by an aisle, each of said racks having a plurality of levels, with storage locations on each of said levels;
   an automated carriage at each of said levels; said automated carriage longitudinally travelling along the associated aisle and adapted to store articles to and retrieve articles from each of the racks at that level; and
   a lift arrangement for delivering articles to and retrieving articles from the levels of said stacked racks, wherein said lift arrangement comprises more than one lift assembly for at least one of said racks, said at least one of said racks having a rack height and each said lift assembly having a vertical mast that extends the rack height of said at least one of said racks and a lift platform that raises and lowers along the mast.

2. The system as claimed in claim 1 wherein said lift arrangement comprises at least two lift assemblies for said at least one of said racks.

3. The system as claimed in claim 2 wherein said lift arrangement comprises at least two lift assemblies for each of said racks.

4. An automated warehouse system, comprising:
   at least two stacked longitudinally extending racks that are laterally separated by an aisle, each of said racks having a plurality of levels, with storage locations on each of said levels;
   an automated carriage at each of said levels; said automated carriage longitudinally travelling along the associated aisle and adapted to store articles to and retrieve articles from each of the racks at that level; and a lift arrangement for delivering articles to and retrieving articles from the levels of said stacked racks, wherein said lift arrangement comprises more than one lift assembly for at least one of said racks, each said lift assembly having a vertical mast and a lift platform that raises and lowers along the mast, wherein said carriage is capable of storing articles to and retrieving articles from at least two separate rows of articles in at least one of said racks, each of said rows at a different distance from said aisle, and wherein at least two lift assemblies are laterally aligned with the at least two rows.

5. The system as claimed in claim 4 including a pass-through support for temporarily supporting articles being dispatched to or retrieved from the laterally spaced lift assembly that is aligned with the one of said rows that is furthest from said aisle.

6. The system as claimed in claim 1 including access conveyors that supply articles to or receive articles from each of said lift assemblies.

7. The system as claimed in claim 6 wherein the access conveyors for the lift assemblies are positioned at different elevations.

8. The system as claimed in claim 7 including a plurality of picking stations, one at each of said different elevations, said picking stations positioned adjacent the access conveyors for the lift assemblies for said stacked racks.

9. The system as claimed in claim 6 including a plurality of access conveyors for at least one of said lift assemblies.

10. The system as claimed in claim 6 including an article feeding conveyor connected with at least one of said access conveyors.

11. The system as claimed in claim 4 wherein said lift assemblies for the at least two lift assemblies for at least one of said racks are positioned at different distances from said racks.

12. The system as claimed in claim 11 wherein the one of said lift assemblies that is aligned with the row of articles that is furthest from said aisle is closer to said racks than is the one of said lift assemblies that is aligned with the row of articles that is closest to said aisle.

13. A method of storing articles to and retrieving articles from an automated warehouse system having at least two stacked longitudinally extending racks that are laterally separated by an aisle, each of said racks having a plurality of levels, with storage locations on each of said levels and an automated carriage at each of said levels, said automated carriage longitudinally travelling along the associated aisle and adapted to store articles to and retrieve articles from each of the racks at that level, said method comprising:

having a lift arrangement for the levels of said stacked racks, wherein said lift arrangement comprises more than one lift assembly for at least one of said racks, said at least one of said racks having a rack height and each said lift assembly having a vertical mast that extends the rack height of said at least one of said racks and a lift platform that raises and lowers along the mast; and delivering articles to and retrieving articles from said at least one of said racks with said more than one said lift assembly.

14. The method as claimed in claim 13 wherein said lift arrangement comprises at least two lift assemblies for said at least one of said racks.

15. The system as claimed in claim 14 wherein said lift arrangement comprises at least two lift assemblies for each of said racks.

16. A method of storing articles to and retrieving articles from an automated warehouse system having at least two stacked longitudinally extending racks that are laterally separated by an aisle, each of said racks having a plurality of levels, with storage locations on each of said levels and an automated carriage at each of said levels, said automated carriage longitudinally travelling along the associated aisle and adapted to store articles to and retrieve articles from each of the racks at that level, said method comprising:

having a lift arrangement for the levels of said stacked racks, wherein said lift arrangement comprises more than one lift assembly for at least one of said racks, each said lift assembly having a vertical mast and a lift platform that raises and lowers along the mast, wherein said carriage is capable of storing articles to and retrieving articles from at least two separate rows of articles in at least one of said racks, each of said rows at a different distance from said aisle, and wherein at least two lift assemblies are aligned with the at least two rows and including sending articles to one of said at least two lift assemblies and retrieving articles from the other of said at least two lift assemblies with said carriage.

17. The method as claimed in claim 16 including a pass-through support for temporarily supporting articles being dispatched to or retrieved from the laterally space lift assembly that is aligned with the one of said rows that is furthest from said aisle and including sending articles to and retrieving articles from the laterally spaced lift assemblies while the article is supported by said pass-through support.

18. The method as claimed in claim 13 including access conveyors that supply articles to or receive articles from each of said lift assemblies.

19. The method as claimed in claim 18 wherein the access conveyors for the lift assemblies for each of said racks are at a different elevation.

20. The method as claimed in claim 19 including a plurality of picking stations each at said different elevation, said picking stations positioned adjacent the conveyors for the lift assemblies for said stacked racks and including picking items from or putting items in articles comprised of containers that are stored to or retrieved from the stacked rack for that lift assembly.

21. The method as claimed in claim 16 wherein the at least two lift assemblies for at least one of said racks are positioned at different longitudinal distances from said racks.

22. The method as claimed in claim 21 wherein the one of said lift assemblies that is aligned with the row of articles that is furthest from said aisle is closer to said racks than the one of said lift assemblies that is aligned with the row of articles that is closest to said aisle.

* * * * *